United States Patent
Granat et al.

(10) Patent No.: US 8,736,245 B1
(45) Date of Patent: May 27, 2014

(54) METHOD AND MEANS TO COMBINE PULSE WIDTH MODULATION LEVEL CONTROL, FULL RESONANCE AND ZERO VOLTAGE SWITCHING FOR SWITCHED MODE POWER SUPPLIES

(75) Inventors: Stanley M. Granat, Baldwinsville, NY (US); Fred Whitney, Syracuse, NY (US); Jorge-Luis B. Romeu, Syracuse, NY (US); Russell S. Trask, Cicero, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 577 days.

(21) Appl. No.: 13/010,518

(22) Filed: Jan. 20, 2011

(51) Int. Cl.
*G05F 1/575* (2006.01)

(52) U.S. Cl.
USPC .............................. 323/285; 363/95

(58) Field of Classification Search
USPC ................. 323/282, 285; 363/78, 95
See application file for complete search history.

(56) References Cited

U.S. PATENT DOCUMENTS

| | | | |
|---|---|---|---|
| 4,709,323 A | 11/1987 | Lien | |
| 5,530,335 A | 6/1996 | Decker et al. | |
| 5,648,731 A | 7/1997 | Decker et al. | |
| 6,118,676 A | 9/2000 | Divan et al. | |
| 6,587,356 B2 | 7/2003 | Zhu et al. | |
| 6,788,033 B2 | 9/2004 | Vinciarelli | |
| 6,934,167 B2* | 8/2005 | Jang et al. | 363/21.02 |
| 7,023,187 B2 | 4/2006 | Shearon et al. | |
| 7,154,250 B2 | 12/2006 | Vinciarelli | |
| 7,382,114 B2 | 6/2008 | Groom | |
| 7,560,909 B2 | 7/2009 | Coleman | |
| 7,596,006 B1 | 9/2009 | Granat | |
| 7,619,323 B2 | 11/2009 | Tan et al. | |
| 7,656,141 B1 | 2/2010 | Granat | |
| 7,714,547 B2 | 5/2010 | Fogg et al. | |
| 7,777,459 B2 | 8/2010 | Williams | |
| 7,782,027 B2 | 8/2010 | Williams | |
| 7,786,712 B2 | 8/2010 | Williams | |
| 7,821,238 B1 | 10/2010 | Li | |
| 7,889,524 B2 | 2/2011 | Lee et al. | |
| 2002/0012260 A1* | 1/2002 | Jain et al. | 363/127 |
| 2010/0013304 A1 | 1/2010 | Heineman | |
| 2010/0013305 A1 | 1/2010 | Heineman | |
| 2010/0013306 A1 | 1/2010 | Heineman et al. | |
| 2010/0013307 A1 | 1/2010 | Heineman et al. | |
| 2010/0283322 A1 | 11/2010 | Wibben | |
| 2011/0006743 A1 | 1/2011 | Fabbro | |
| 2011/0043172 A1 | 2/2011 | Dearn | |

* cited by examiner

*Primary Examiner* — Jeffrey Sterrett
(74) *Attorney, Agent, or Firm* — Howard IP Law Group, PC

(57) ABSTRACT

A method for operating a switching power supply is provided. The method includes generating a half sine wave signal for coupling to a pulse width modulator, detecting the zero crossings of the half sine wave signal, and altering the pulse width of the supply output such that the on and off timing of the pulse width corresponds to a zero crossing of the half sine wave signal.

19 Claims, 9 Drawing Sheets

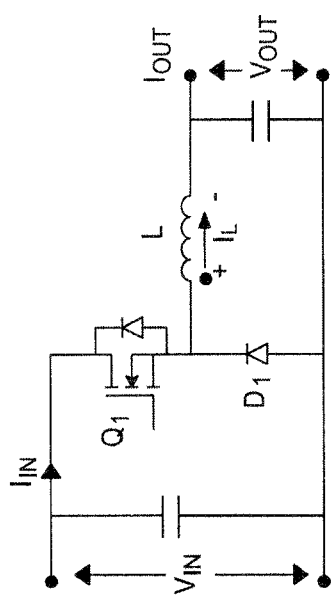
FIG. 1
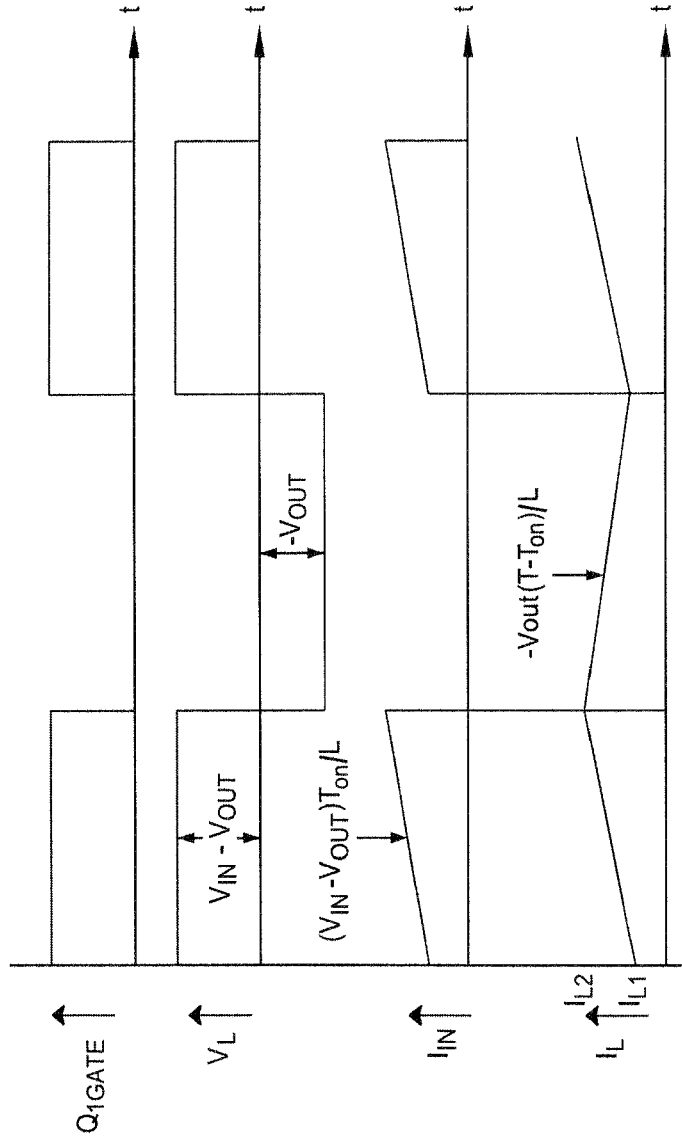
FIG. 2a
FIG. 2b
FIG. 2c
FIG. 2d

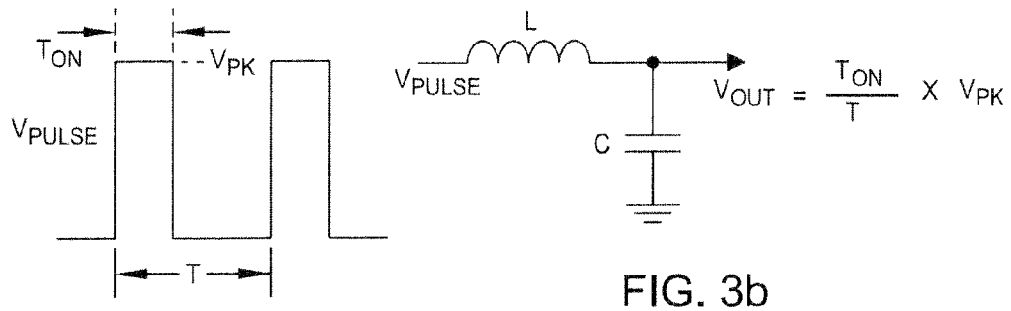
FIG. 3a
FIG. 3b
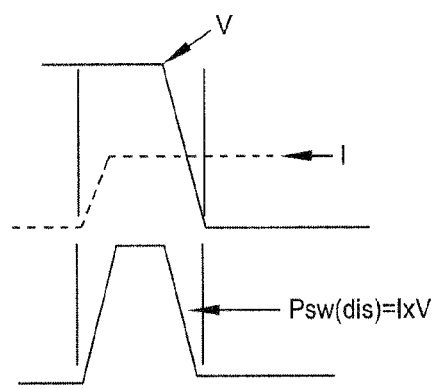
FIG. 4
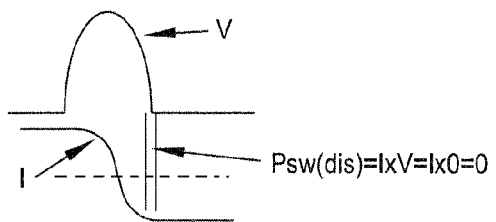
FIG. 5

METHOD AND MEANS TO COMBINE PULSE WIDTH MODULATION LEVEL CONTROL, FULL RESONANCE AND ZERO VOLTAGE SWITCHING FOR SWITCHED MODE POWER SUPPLIES

FIELD OF THE INVENTION

The present invention relates generally to power supplies, and more specifically, to soft switching power supplies implementing pulse width modulation (PWM).

BACKGROUND

Regulated power supplies, including switched mode power supplies (SMPSs) are found in numerous electronic systems and devices. Despite the efficiency advantages of SMPSs over, for example, linear power supplies, they are known to introduce significant radiated losses during switching operations. In particular, SMPSs are limited in efficiency by "hard switching" (i.e. switching at non-zero volts) topologies and parasitic power dissipation in their associated magnetic components. In these topologies, switching causes a rapid transition in the current through the switch, such as a transistor, resulting in losses in the form of signal emissions. Moreover, these switching transients may include a spectrum containing high frequency components, which can introduce noise into the system in addition to the power losses.

In order to reduce these losses, "soft switching" topologies exist which utilize either resonant edge or half sinusoid waveforms to operate the switches in a zero voltage switching (ZVS) mode (i.e. zero volts at the time of switching). For example, a resonator may be used to force the current in the transistor to zero during the switching period. This reduces or eliminates switching transients and the radiated emissions caused by rapid transitions in the current. However, these methods incorporate time-consuming waveform changes within a switching period that may limit applications to lower switching frequencies (e.g. 50-200 kHz). These lowered switching frequencies prevent size and weight reductions of the magnetic components, both of which may decrease as the operating frequency rises.

Further, the use of half sinusoid resonant pulses (or a section thereof) as a fixed-area pulse requires the supply to utilize pulse frequency modulation (PFM) at a fixed duty cycle in order to control its average output. However, varying the operating frequency of the PWM controller is undesirable in many applications, such as RADAR systems and other military power supplies.

Alternative pulse width modulated SMPSs and control methods are desired.

SUMMARY

In one embodiment of the present invention, a method of operating a switching power supply is provided. The method comprises the steps of generating a single-polarity pulse train, such as a half sine wave signal for coupling to a pulse width modulator. By detecting the zero crossings of the half sine wave signal, the pulse width of the PWM controller output can be altered such that the on/off timing of the pulse width corresponds to a respective zero crossing of the half sine wave signal. This arrangement provides for zero volt switching of the PWM, as well as fixed frequency operation.

In another embodiment of the present invention a switching power supply is provided. A signal generator is responsive to an input voltage to provide a fixed frequency oscillating signal. This oscillating signal is provided to a detector for determining its zero crossings. A pulse width modulator is responsive to both the oscillating signal, or a waveform generated therefrom, and the detected zero crossings for performing pulse width modulation starting and ending at detected zero crossings of the signal.

BRIEF DESCRIPTION OF THE DRAWINGS

FIG. 1 is a circuit diagram of a buck mode power supply useful for describing the function of a typical PWM controller in a SMPS.

FIGS. 2a-d are plots illustrating the function of the supply of FIG. 1.

FIGS. 3a and 3b are diagrams illustrating the output of the SMPS of FIG. 1.

FIGS. 4 and 5 are diagrams illustrating the power loss associated with both hard and soft switching topologies respectively.

DETAILED DESCRIPTION OF PREFERRED EMBODIMENTS

Figure 6:
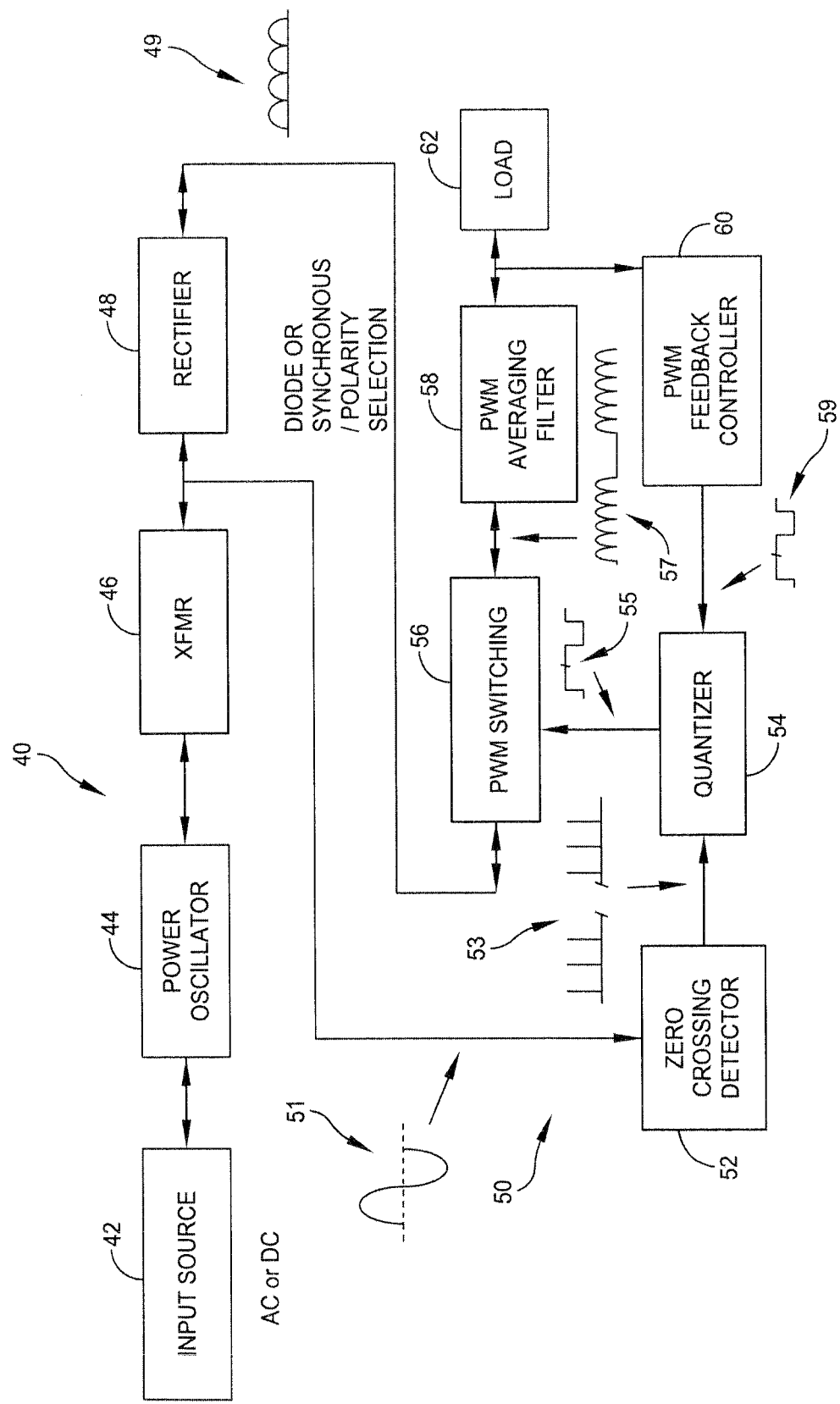
FIG. 6 is a block diagram of a power supply according to an embodiment of the present invention.

It is to be understood that the figures and descriptions of the present invention have been simplified to illustrate elements that are relevant for a clear understanding of the present invention, while eliminating, for purposes of clarity, many other elements found in typical pulse-width modulated power supplies. However, because such elements are well known in the art, and because they do not facilitate a better understanding of the present invention, a discussion of such elements is not provided herein. The disclosure herein is directed to all such variations and modifications known to those skilled in the art.

In the following detailed description, reference is made to the accompanying drawings that show, by way of illustration, specific embodiments in which the invention may be practiced. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout several views.

Embodiments of the present invention are directed to a method and means to achieve ZVS in a PWM power supply. Referring generally to FIGS. 1-3, the basic operating principles of a PWM supply are shown and described in reference to the operation of a buck mode converter. In the exemplary converter (FIG. 1), a switch, such as transistor Q1 is placed in series with an input voltage source $V_{IN}$, and used to control the average output of the converter by controlling the on/off duty cycle of transistor Q1. Input source $V_{IN}$ is fed through transistor Q1 and into a low-pass filter arrangement, for example, inductor L and a capacitor C. During steady state operation, with transistor Q1 on for a period of $T_{ON}$ (FIG. 3), current flows through Q1 and the difference of voltages between $V_{IN}$ and $V_{OUT}$ is applied to inductor L in the forward direction, as shown in FIG. 2b. FIG. 2c shows the input current $I_{IN}$. Inductor current $I_L$ rises linearly from its initial value $I_{L1}$ to $I_{L2}$, as shown in FIG. 2d. During period $T_{OFF}$, when transistor Q1 is off, the inductor current $I_L$ continues to output in the same direction, as the stored energy within the inductor continues to supply the load current. During this $T_{OFF}$ period, the output voltage $V_{OUT}$ is applied across the inductor in the reverse direction, as shown in FIG. 2b. Therefore, inductor current $I_L$ decreases from its present value $I_{L2}$ to $I_{L1}$, as shown in FIG. 2d.

Referring generally to FIGS. 3a and 3b, the average output of the supply of FIG. 1 will be equal to the duty cycle of the transistor (the ratio of time on vs. time off) multiplied by input voltage $V_{IN}$. During fixed-frequency PWM operation, the pulse width ($T_{ON}$) will be varied within a given switching period T in order to increase or decrease the average output. The on/off control of transistor Q1 may be operated by a PWM feedback controller configured to monitor the inductor current as well as the output voltage $V_{OUT}$ of the capacitor C1 in a feedback loop, and alter the duty cycle according to a desired output voltage. While a buck-mode converter is shown, it should be understood that the basic function of PWM control may be used in combination with any number of SMPS topologies.

As set forth above, the on/off switching of the transistor (or transistors) in various SMPS topologies creates significant switching losses, thus reducing the overall efficiency of the supply. Switching losses occur during switching transitions as spikes in power are created due to rising voltage and falling current overlaps, and vice versa depending on the particular transition. In general, these losses occur due to inductor forced interactions. Parasitic capacitances provide conduction paths for conducted electromagnetic interference (EMI) from switching transition spikes. Referring generally to FIG. 4, a "hard switching", or switching beginning at a period when the input voltage V is non-zero, is shown. The power dissipated is generally equal to the current I times the voltage V at the time of the switching.

Referring generally to FIG. 5, "soft switching" topologies may be implemented using, for example, resonant edge or half sinusoid waveforms as the supply input to improve efficiency. Specifically, power dissipation is reduced by operating the switches when the input waveform voltage is near or equal to zero. In existing half sinusoid topologies, however, the fixed pulse width requires varying the repetition frequency (i.e. operating the PWM controller at varying frequency at a fixed duty cycle set by the waveform width) to control the average output of the supply (PFM). This variable frequency of operation is undesirable in many applications.

Embodiments of the present invention are directed to high-efficiency switched mode power supplies responsive to AC or DC input sources. In one embodiment of the present invention, a supply comprises a front end acting as a power oscillator, configured to generate a high, fixed frequency signal, such as a sine wave. In one embodiment, the resulting signal amplitude may be modulated only by the input level.

The resulting oscillating signal can be level shifted by a transformer and rectified to create a single-polarity pulse train that is provided to a switched mode electronic power converter. In the case of a rectified sinusoid waveform, each pulse will begin and end at zero voltage. A zero crossing detector may be provided to determine the zero crossings of the fixed frequency signal from the output of the transformer, and output a corresponding timing signal indicative of these zero crossings.

The pulse width generated by a PWM controller operating at a lower frequency than the input waveform will be quantized to the nearest zero crossing of the input waveform. In this manner, the switched components of the supply activate and deactivate at a zero crossing of the rectified sinusoid, thus operating in a "soft switching" mode. This creates clusters of pulses whose average comprises the pulse width modulated output level of the converter.

With reference to FIG. 6, a block diagram of a PWM power supply 40 according to an embodiment of the present invention is shown and described. An input voltage source 42, for example, an AC or DC source is coupled to a power oscillator 44, such as an inverter. Oscillator 44 is configured to generate a fixed frequency oscillating signal. Oscillator 44 may operate at 50% duty cycle, providing for generally fixed frequency operation with no amplitude control. In one embodiment of the present invention, oscillator 44 may be operated at full resonance used to generate a low distortion, high frequency sine wave.

In the exemplary isolated supply 40, the output of power oscillator 44 may be amplitude shifted by a transformer 46, rectified by a rectifier 48 and coupled to a pulse width modulated output section 50 of the converter. The fixed-frequency nature of the input signal through the transformer provides several benefits, such as reduced core and eddy current losses in the conductors. Moreover, the ability to operative the transformer in a resonant manner absorbs parasitic capacitance, minimizing transfer losses.

Figure 7A:
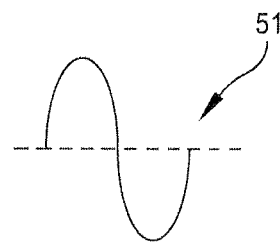
FIGS. 7a-7e are plots of exemplary waveforms created at various stages of operation of the power supply of FIG. 6.
Figure 7B:
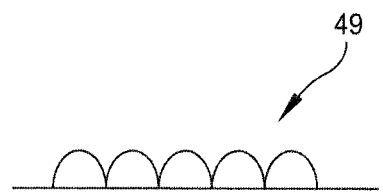
Figure 7C:
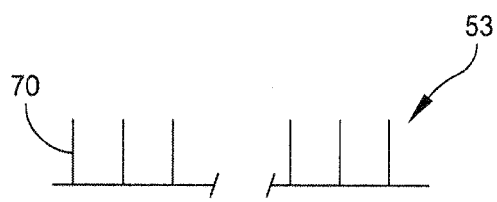

The output oscillating amplitude shifted signal 51 (FIG. 7a) from transformer 46 is coupled to rectifier 48. In one embodiment, rectifier 48 may comprise a full-wave rectifier for generating a single-polarity, half sine wave pulse train 49 (FIG. 7b) from the sinusoidal signal 51 provided by transformer 46. The output section of the supply comprising PWM 50 is configured to receive pulse train signal 49. This signal provides the opportunity for ZVS at every half cycle (FIG. 7c) as the half sine wave amplitude drops to zero (i.e. the start and end of each half sine wave).

Figure 7D:
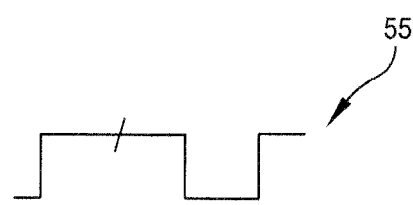

A set forth above with respect to FIGS. 1-3, PWM 50 is operative to control the average output of the supply by creating a gated pulse 55 (FIG. 7d) to implement duty cycle control of PWM switching controller 56. Embodiments of the present invention achieve ZVS by synchronizing the start and end of each pulse gated pulse 55 with respective zero-crossings of the signal generated by power oscillator 44, for example, the resonant sine wave 51.

In one embodiment of the present invention, a detector 52 may be provided for determining the zero crossings of sine wave 51. In the exemplary embodiment, the detector 52 may be coupled to the output of transformer 46, while in alternate embodiments, the detector 52 may be coupled to the output of the rectifier 48 without departing from the scope of the present invention, as the zero crossings of sine wave 51 correspond the zero-voltage values of pulse train 49.

Detector 52 may output a signal, such as a pulse train 53 (FIG. 7c) representative of the detected zero crossings 70. As set forth above, the spacing between zero crossings 70 should be generally fixed, as sinusoid signal 51 and half sine wave pulse signal 49 operate at a fixed frequency. Output signal 53 from detector 52 may be provided to a quantizing module 54. Quantizer 54 is responsive to signal 53, in conjunction with a PWM feedback controller 60, to provide ZVS of PWM 50.

Feedback controller 60 may operate in a conventional manner. For example, controller 60 may be operative to sample the supply output voltage (or current) and subtract the result from a reference voltage to establish an error signal. This error signal is compared to a generated oscillator ramp signal. By comparing the crossings of the ramp signal and the error signal, a pulse width feedback control signal 59 is generated. In traditional PWM supplies, this signal 59 is operative to control the on/off timing of the PWM switching. In this way, when the supply output voltage changes, the error signal is altered and thus the output pulse width of feedback control signal 59 also changes. This duty cycle change varies the output voltage of the supply so as to minimize the error signal, completing the control loop.

Figure 7E:
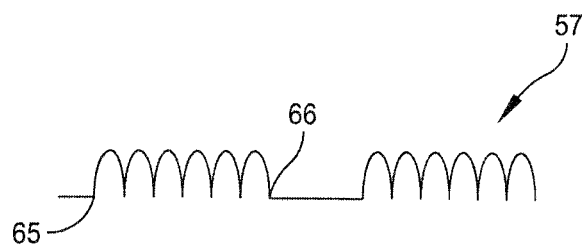

Still referring to FIG. 6, in the exemplary embodiment, feedback control signal 59 represents the on/off timing of PWM 50 necessary to minimize the output voltage error, however, it is not synchronized to the zero-crossings of the input signal 49. Feedback control signal 59 is output from feedback controller 60 to quantizer 54. Quantizer 54 is operative to, for example, adjust the width of the pulses comprising feedback control signal 59 to fit N number of half sine pulses of input signal 49 therewithin. In this way, the start and end of each gate pulse will correspond to a first and second zero crossing. Thus, the adjusted pulse width control signal 55 output from the quantizer 54 is a version of control signal 59 of the feedback controller quantized to the nearest zero crossings of the input signal 49 (and sine wave 51). In this way, N half sine wave pulses serve as the equivalent PWM control pulse 57 (FIG. 7e) in the PWM, and the PWM takes on a soft-switching arrangement as the switching occurs at zero volts (e.g. at points 65, 66). Varying the duty cycle of PWM 50 may include, for example, altering the control signal 55 by the width of one or more half sine wave pulses (e.g. N−1 pulses). Finally, PWM 50 may include an averaging filter 58 (e.g. an inductor and a capacitor, see FIG. 1) to smooth out the pulsed PWM output 57 supplied to a load 62.

This arrangement combines high, fixed frequency power conversion through a transformer, with ZVS PWM operation, while maintaining relatively low fixed frequency operation of the PWM compared to the frequency of the input waveform in order to achieve the above-described benefits and improved efficiency over supplies of the prior art.

Figure 8:
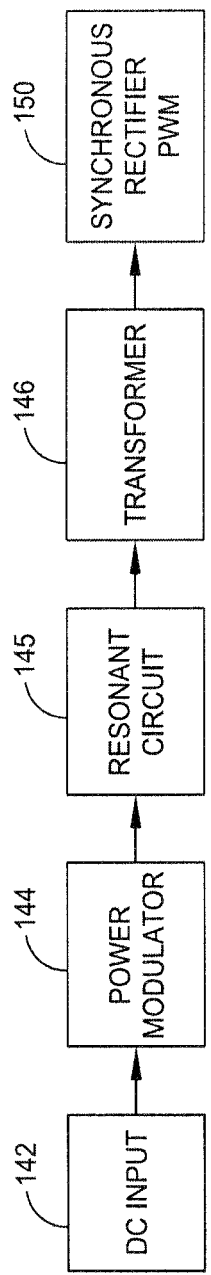
FIG. 8 is a block diagram of a power modulator according to an embodiment of the present invention.
Figure 9:
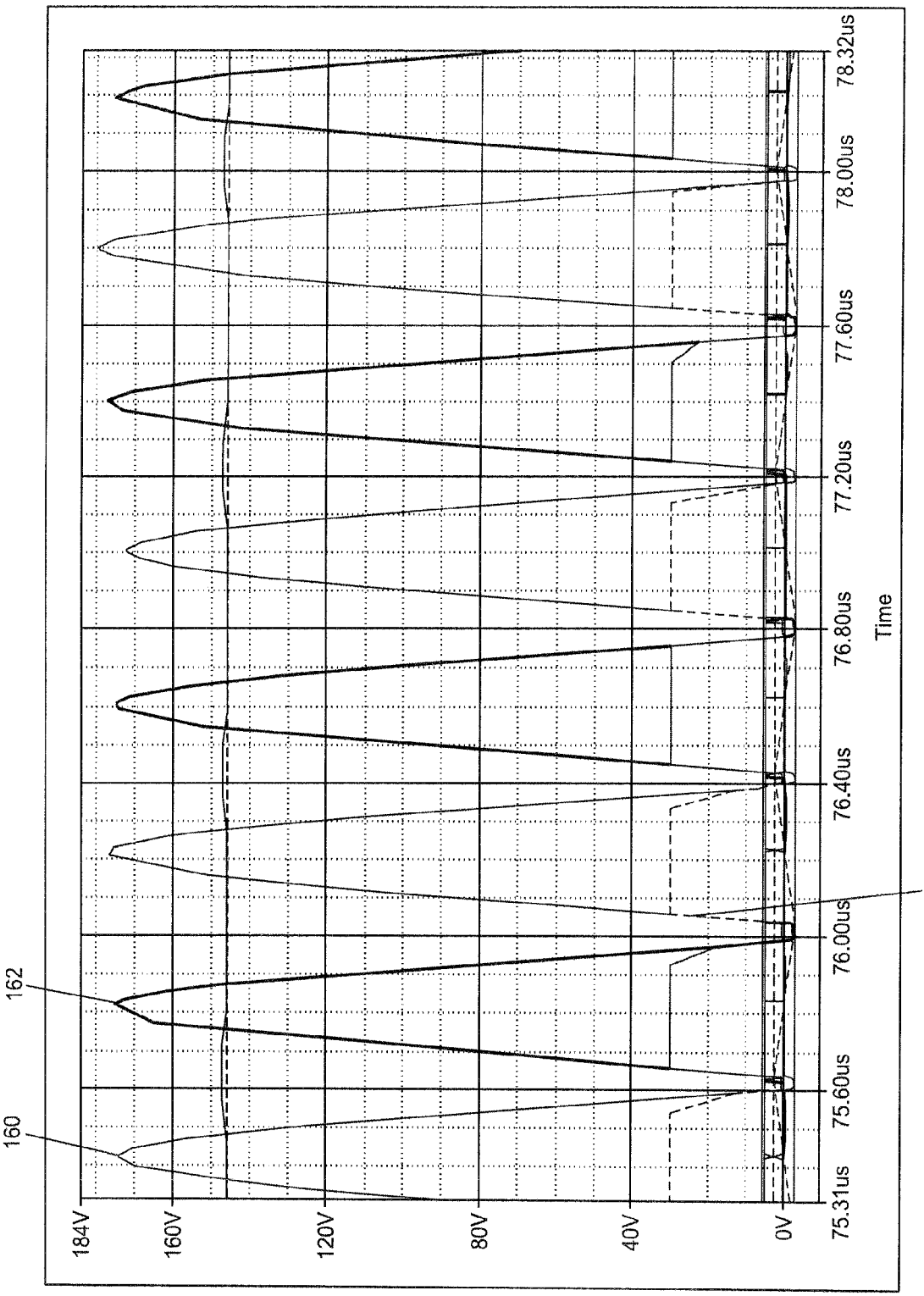
FIG. 9 is a plot of the output of the modulator of FIG. 8.

Referring generally to FIGS. 8 and 9 a power modulator according to an embodiment of the present invention is shown and described. The exemplary power modulator may take on a form similar to that described with respect to FIG. 6, for example, a DC input 142 coupled to a power modulator 144 and a resonant circuit 145 for generating a fixed-frequency sine wave. The sine wave signal is provided to transformer 146. The output of the transformer is coupled to a PWM supply output, comprising, for example, a rectifier, zero-crossing detector, quantizer, and a switching PWM controller operative to synchronize the on/off switching of the supply with the zero crossings of the input rectified sine wave.

FIG. 9 is a plot showing the results of a simulation of the above-described power modulator. The unfiltered supply output comprises half sinusoid voltages 160, 162 generated during each switching period. The switching period is determined by the control signal 163 generated by, for example, a quantizer, zero-crossing detector, and feedback controller that tracks the frequency of resonant circuit 145. Note that the on/off timing of the switching signal 163 corresponds to a zero voltage portion of the half sinusoid signal, reflecting the desired ZVS operation.

Figure 10:
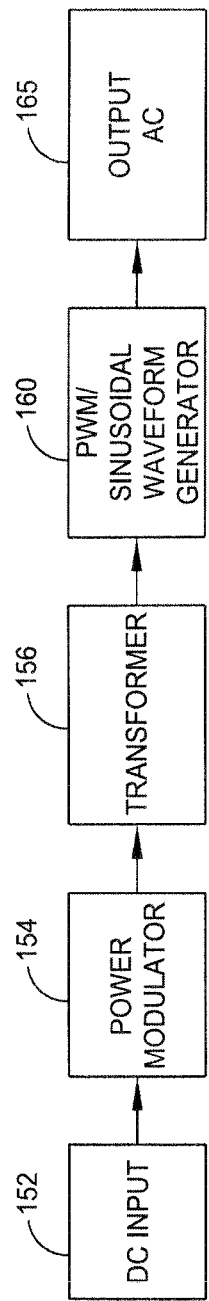
FIG. 10 is a block diagram of a power inverter according to an embodiment of the present invention.

FIG. 10 is a block diagram of a buck mode inverter according to an embodiment of the present invention. As set forth above with respect to the embodiments of FIGS. 6 and 8, the inverter may comprise an input voltage source 152 coupled to a power modulator 154 operative to generate a fixed-frequency sine wave for supplying to a transformer 156. The output of the transformer is coupled to a PWM buck stage, such as a half or full H-bridge topology. It should be understood that any suitable supply topology may be used in the supplies of the present invention depending on, for example, intended operation and desired performance characteristics. PWM controller 160 may operate in the above-described fashion to achieve ZVS of the buck stage, however, a sine wave synthesizer may be incorporated into the supply in order to generate an AC supply output 165.

Figure 11:
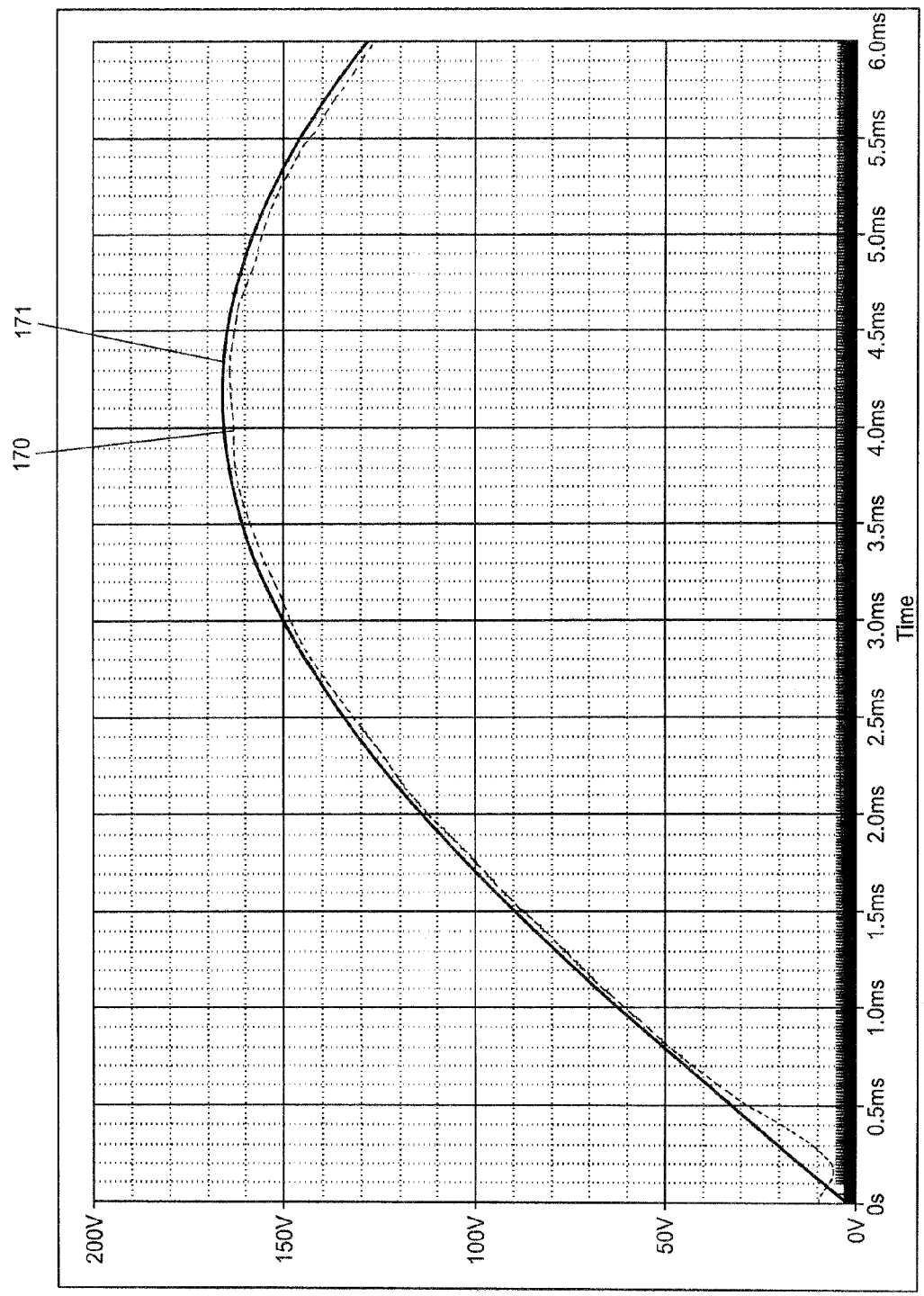
FIGS. 11 and 12 are plots of the output of the inverter of FIG. 10.
Figure 12:
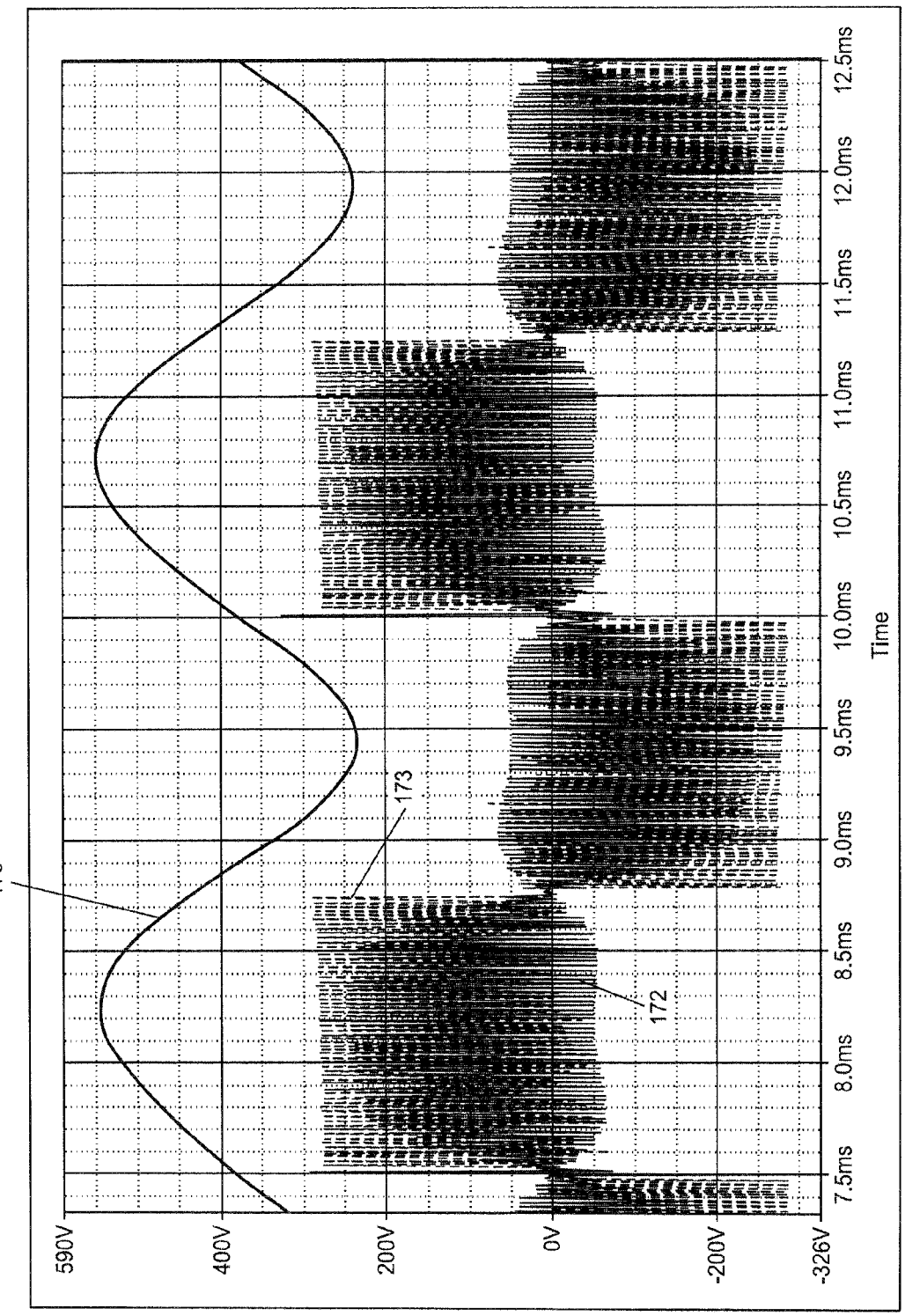

The simulation results of this embodiment are provided in FIGS. 11 and 12. Referring to FIG. 11, the AC output 170 of the inverter is shown, closely tracking a reference sinusoid 171. FIG. 12 illustrates the ZVS operation of the inverter. Specifically, the AC output 170 (amplitude shifted in the figure) is shown with the corresponding sine source 172 and the PWM drive signal 173. The PWM comprises zero, or near zero, duty cycle at the zero crossings of the output waveform 170. The half sine pulses of source 172 illustrate the ZVS function of the supply implementation, as each pulse starts and stops at the half sine wave zero-crossings of source 172.

While the above-described embodiments and accompanying diagrams describe particular circuit devices, such as comparators, inductors, and transformers, it is envisioned that these devices may be replaced with alternatives suitable to achieve the described desired function without departing from the scope of the present invention.

While the foregoing invention has been described with reference to the above-described embodiment, various modifications and changes can be made without departing from the spirit of the invention. Accordingly, all such modifications and changes are considered to be within the scope of the appended claims. Accordingly, the specification and the drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations of variations of various embodiments. Combinations of the above embodiments, and other embodiments not specifically described herein, will be apparent to those of skill in the art upon reviewing the above description.

What is claimed is:

1. A method for operating a switching power supply comprising the steps of:
generating an oscillating signal for coupling to a pulse width modulator (PWM), the PWM configured to, in response to a pulse width control signal, control the on/off timing of the output of the power supply;
detecting the zero crossings of the oscillating signal;
altering the pulse width of the pulse width control signal input to the PWM such that the on/off timing of the pulse width of the control signal corresponds to a plurality of zero crossings of the oscillating signal;
wherein the step of altering the pulse width of the pulse width control signal comprises quantizing the pulse width control signal with the detected zero crossings of the oscillating signal.

2. The method of claim 1, wherein the step of generating an oscillating signal comprises coupling an input source to a power oscillator for generating a single frequency sinusoidal waveform.

3. The method of claim 2, further comprising the step of amplitude shifting the sinusoidal waveform by coupling the power oscillator to the input of a transformer.

4. The method of claim 2, further comprising the step of rectifying the sinusoidal waveform to create a single polarity half sine wave signal for coupling to the PWM.

5. The method of claim 4, wherein the step of quantizing the pulse width control signal with the detected zero crossings of the oscillating signal comprises quantizing the pulse width control signal with the detected zero crossings of the half sine wave signal.

6. The method of claim 5, wherein the pulse width control signal is synchronized with the zero crossings of the half sine wave signal.

7. A switching power supply comprising:
at least one power converting stage operatively connected to a load;
a signal generator for producing an oscillating signal;
a detector for determining the zero crossings of the oscillating signal;
a pulse width modulator (PWM) responsive to a pulse width control signal for selectively controlling the on/off timing of the output of the power converting stage to thereby control the average output of the switching power supply, the PWM responsive to the detector for synchronizing the pulse width control signal input to the PWM with the detected zero crossings of the oscillating signal such that the on/off timing of the pulse width of the control signal corresponds to a plurality of zero crossings of the oscillating signal; and
a controller for quantizing the pulse width control signal to the nearest detected zero crossing of the oscillating signal.

8. The switching power supply of claim 7, further comprising a feedback controller configured to monitor the output of the power converting stage.

9. The switching power supply of claim 8, wherein the feedback controller is operative to output a pulse width control signal operative to minimize an error between the output of the supply and a reference voltage.

10. The switching power supply of claim 7, wherein the signal generator comprises an input voltage source and a power oscillator.

11. The switching power supply of claim 10, further comprising a transformer coupled to the output of the power oscillator.

12. The switching power supply of claim 11, wherein the detector is coupled to the output of the transformer.

13. The switching power supply of claim 11, further comprising a rectifier coupled to the output of the transformer.

14. The switching power supply of claim 13, wherein the power oscillator is operative to output a fixed-frequency signal.

15. The switching power supply of claim 14, wherein the fixed-frequency signal comprises a sinusoidal signal.

16. The switching power supply of claim 15, wherein the rectifier is operative to output a half sine wave pulse train to an input of the PWM.

17. The switching power supply of claim 16, wherein the power converting stage is configured to generate a pulsed output, and wherein each pulse comprises a plurality of half sine wave pulses.

18. The switching power supply of claim 7, wherein the controller is responsive to the output of the detector and the feedback controller for creating a gate pulse starting and ending at a zero crossing.

19. The switching power supply of claim 7, wherein the PWM operates at a fixed frequency.

* * * * *